(12) United States Patent
Jaegtnes et al.

(10) Patent No.: US 6,721,889 B1
(45) Date of Patent: Apr. 13, 2004

(54) DEVICE FOR PROTECTING AN ELECTRONIC APPARATUS

(75) Inventors: Leif Ingemar Jaegtnes, Vienna (AT); Gerhard Zimmermann, Vienna (AT)

(73) Assignee: Ericsson Enterprise GmbH, Vienna (AT)

(*) Notice: Subject to any disclaimer, the term of this patent is extended or adjusted under 35 U.S.C. 154(b) by 0 days.

(21) Appl. No.: 09/269,227

(22) PCT Filed: Sep. 24, 1997

(86) PCT No.: PCT/AT97/00207

§ 371 (c)(1), (2), (4) Date: Jul. 14, 1999

(87) PCT Pub. No.: WO98/13741

PCT Pub. Date: Apr. 2, 1998

(30) Foreign Application Priority Data

Sep. 24, 1996 (AT) ................................................ 1694/96

(51) Int. Cl.⁷ ................................................ H04L 9/00
(52) U.S. Cl. ........................ 713/200; 713/202; 713/164; 713/193; 705/56
(58) Field of Search ................................ 713/200, 202, 713/193; 717/139, 164; 340/525, 825.22, 425.5, 426.14; 345/169, 835, 380, 382; 705/55, 56

(56) References Cited

U.S. PATENT DOCUMENTS

| 5,182,770 A | 1/1993 | Medveczky et al. |
| 5,222,133 A | 6/1993 | Chou et al. |
| 5,357,573 A | * 10/1994 | Walters .................... 713/193 |

FOREIGN PATENT DOCUMENTS

| EP | 000696016 A2 | * 2/1996 |
| WO | WO86/05898 | 10/1986 |
| WO | WO88/05941 | 8/1988 |

* cited by examiner

Primary Examiner—Ly V. Hua

(57) ABSTRACT

A method and system to activate or deactivate modifiable features, the system comprising a protected device having a plurality of modifiable features and an identification means, a protective device for modifying the modifiable features of the protected device, wherein the protective device is adapted to be in selective in communication with the protected device and the protective device comprises a processor, a first memory in communication with the processor for storing a plurality of activation codes, a second memory in communication with the processor for storing a plurality of release programs corresponding to the activation codes.

22 Claims, 1 Drawing Sheet

DEVICE FOR PROTECTING AN ELECTRONIC APPARATUS

BACKGROUND

The invention relates to a device for protecting an electronic apparatus, an installation, a system or the like against the use of functions that can be executed via lockable programs or program parts which device can be connected with the apparatus to be protected, an installation, a system or the like via an interface, whereas the protective device is assigned an identification number and contains a preferably non-erasable memory, for example, an EEPROM, for the storing of at least one activation code which activation code can be compared to the identification number, and a read-protected program memory for the storing of at least one release program is provided which release program upon agreement of the activation code with the identification number of the protective device is carried out.

Devices of this type which are also called dongle, security device, hardlock etc. serve for the protection of the individual functions of the computer software which are executed by programs or program parts. The software protection known so far is based on software and hardware solutions or on a combination of these.

Purely software solutions are typical for professional computer systems which are assigned an individual identification number, appearing only once worldwide, of the Node-ID. The protected program runs only if for every query code an appropriate answer code has been stored in the system. Prior to the execution of the program or program part, the device software calculates, from the machine identification number, a primary key value which is compared with a second primary key value calculated from the answer code. If these fit to one another, the program proceeds. Even just a part of the program code can be encoded which has to, first, be formed with a cipher key and then decoded from the answer code and the serial number.

The advantages of such a software solution lie in its user-friendly maintenance, since the storage of the answer code in the system occurs very rapidly automatically via, for example, modem or manually on the keyboard, or by transferring the code on the telephone, by fax, or orally to a service personnel who then enters it. Furthermore, it is advantageous that, for various program functions, also various codes are possible. No additional costs are incurred for every protected program and relatively high security is afforded.

The disadvantages of such a software solution exist in the fact that a change to another system with another identification number from the licensee cannot be performed. Further, the system to be protected required an unmistakable identification number which, however, is not always available and thus the system is non-secure.

As the second large area of known realization of software protection, hardware solutions that are typically employed in the PC area are considered. A device ("dongle") connected to a computer interface answers to a query code with an answer code. Instead of simple answer codes, a coded part of the program can be decoded using this dongle or calculations of program algorithms can be transferred into the dongle. The advantages of the hardware solutions exist in the fact that the protection in the form of the dongle can be transferred from system to system which is important in an exchange of systems in the case of a defect or a generation upgrade. No identification number within the system is necessary.

A disadvantage of such a hardware solution exists, however, in the fact that normally only protection for one program or program part is obtainable for each dongle. Individual program parts cannot, or only with much effort, be newly licensed. Furthermore, this requires an own interface and also derives its power supply from the same.

The U.S. Pat. No. 5,222,133 discloses a protective device in which, for each attached program part, an answer code is stored in the read-only memory of the system to be protected, from where it can be called upon using a correct activation code.

SUMMARY

It is the object of the invention to specify a device of the type mentioned at the outset, which device offers protection against the unauthorized operation of a plurality of locked functions, without having to provided parts needed exclusively therefor in the apparatus to be protected.

It is a further object of the invention to make possible a change in the functions to be released which, without having to return the installation to be protected or the protective device to the licensor, can also be performed over long distances.

According to the invention, this is achieved in that the read-protected program memory for the storing of at least one release program is provided together with the memory for the storing of at least one activation code in the protective device.

In so doing, not only the identification number is contained in the protective device according to the invention, but it also contains the memory for the release program for the individual functions of the apparatus to be protected.

In this way, a protection against the unauthorized release of programs or program parts is made possible without having to re-calculate the activation code upon exchange of the apparatus or the installation to be protected. Based on the instructions of the program memory in the protective device, it is not needed in the installation to be protected. Various protection mechanisms can be chosen for the individual programs or program parts, as long as the appropriate algorithms fit into the program memory of the protective device according to the invention. These can then be turned on or off individually. Should the apparatus to be protected become defective, a replacement system with the protective device according to the invention can continue to operate at any time. The protective device according to the invention can already be pre-configured to the desired specifications of the user at the system manufacturer or the software supplier.

According to another variation of the invention, it can provided that, in the read-protected program memory, a plurality of release programs and, in the activation code memory, the activation codes corresponding to the release programs are stored, which release programs are selected separately from one another.

In that way, protection mechanisms for a plurality of programs or program parts can be chosen in various forms independently from one another.

According to another characteristic of the invention, the read-protected program memory can provided along with a microprocessor in a protective device.

In that way, all communications or re-coding and comparison processes can be processed centrally in a simple manner.

In a further elaboration of the invention, it can be provided that at least one part of the release programs can be activated via an input device separate from the apparatus to be protected and connected with the protective device.

If, on the apparatus to be protected, there is no input system for the activation of further release programs, then the activation codes of the protective device according to the invention can be changed, in this way, on this separate input system accordingly.

According to another variation of the invention, it can provided that the protective device can be connected via a plug to the apparatus, installation, system or the like to be protected.

In so doing, the authorization obtained through the protective device for the operating of the particular program also for other apparatuses, installations, for example, for an installation of a next generation can be replaced with such a plug connection.

In a further elaboration of the invention, it can be provided that the power supply of the protective device is provided from the parallel interface.

In that way, the protective device can be operated without its own power supply arrangement.

A further object of the invention can consist in specifying a method for the release of a locked program or program part with the use of a protective device according to the invention.

This can be achieved in a way in which, in a first step, from the apparatus, the installation, the system or the like a query of a program or a program part for a protected function is passed on to the protective device, in which, in a second step, a release program deposited in the program memory is found with which the query is answerable, in which, in a third step, the corresponding activation code is read from the memory and decoded, and the result obtained therefrom compared with the identification code of the protective device, in which, in a fourth step, upon agreement of the identification number and the decoded activation code, the found release program releases the locked program or program part in the apparatus, or, in the case that there is no agreement of the identification number with the decoded activation code the program or program part remains locked in response to the query.

In this manner, different programs or program parts can be released from the locking device independent of one another in the apparatus to be protected; however, no storage of data in the apparatus to be protected can occur in this way, instead all of the parts subject to the protective measures are concentrated in the protective device.

In a further elaboration of the invention, it can be provided that, in the fourth step of no agreement of the identification number with the decoded activation code, the program or program part that corresponds to the query remains with a limited functionality or a time limit while another program is released.

In that way, a probing of activation codes by unauthorized persons is prevented, since the other released program, at first, gives the impression that the activation code was correctly deciphered. Through the resulting waste of time in the search for the correct activation code, the undesired probing of the activation code can be made impossible under normal circumstances.

According to another characteristic of the invention, it can provided that, in the fourth step of no agreement of the identification number with the decoded activation code, a signal-release program is started which triggers a signaling.

In so doing, an unauthorized or erroneously incorrect inputting of an activation code can be notified in a suitable manner, for example, by reporting the process via a modem or depositing in an element of the memory with the date and time of day.

Finally, it can be provided that, in the third step, the corresponding activation code is read from the activation code memory and is tied mathematically with the identification number, by which a functional part of the released program, for example, a calculation constant or a program code is formed.

In that way, the fourth step is dropped, since the released program upon incorrect activation code automatically delivers incorrect results.

BRIEF DESCRIPTION OF THE DRAWINGS

The invention is described in detail in the following using the embodiment examples given in the diagrams.

DETAILED DESCRIPTION

Figure 2:
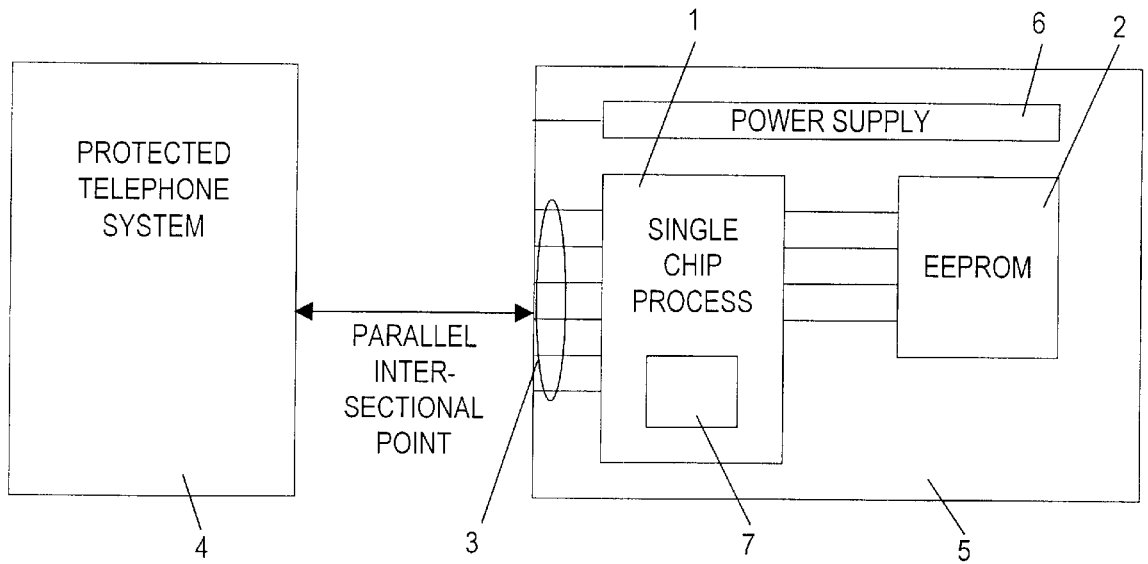
FIG. 2 shows a block diagram with an embodiment of a protective device according to the invention.

In FIG. 2, shown is a device 5 for the protection of a telephone extension installation 4 against the use of certain functions that can be performed via programs or program parts. These functions have already been provided in the telephone installation during manufacturing but have been locked in the distribution to the end user. Thus, such a function can consist of that, for example, conversations can be connected to random straight free extension phones. The installations that are offered for purchase contain all these functions, however, they are only offered at an extra cost. If the end user desires such an additional function, then he can obtain them by, for example, paying a licensing fee, upon which the manufacturer of the installation or an authorized dealer can effect the release of the locked program or program part by saving an appropriate activation code. This should achieve that installations can already be fully equipped with additional functions, but that it is only possible for a small group of persons to perform the release of the same. This can be realized within the scope of the invention for all kinds of electronic apparatuses, installations, systems which work with programs parts or programs.

In so doing, the activation codes can be input via modem or also by means of a keyboard into the apparatus 4 to be protected and then passed on to the protective device 5 which is connected with installation 4 via an interface 3, preferably by means of a plug not shown here. Plug-in protective devices are commonly referred to in the jargon of the industry as "dongles." Via the protective device 5, certain program functions of the installation 4 are releasable or lockable.

The protective device 5 consists of a non-erasable memory, for example, an EEPROM, for the storing of the activation codes which activation codes are callable and comparable with a predetermined identification number, which is deposited as read-protected in the protective device 5. Further, provided is a read-protected program memory 7 for the storing of release programs, in which a certain release program is only then run when there is an agreement of the decoded activation code with the identification number.

By release programs, meant are all known processes such as, for example, program-part or data decoding, external calculations, encoded program parameters, state machines and so forth, individual, combined and/or varied.

According to the invention, thus provided is that the read-protected program memory 7, along with a activation code memory, is arranged in a protective device 5.

In that way, the apparatus 4 to be protected does not have to have its own memory provided and, if this one is defective, a replacement system can continue to work with the same protective device 5 which only has to be plugged into the same, without having to change activation codes or release programs.

Figure 1:
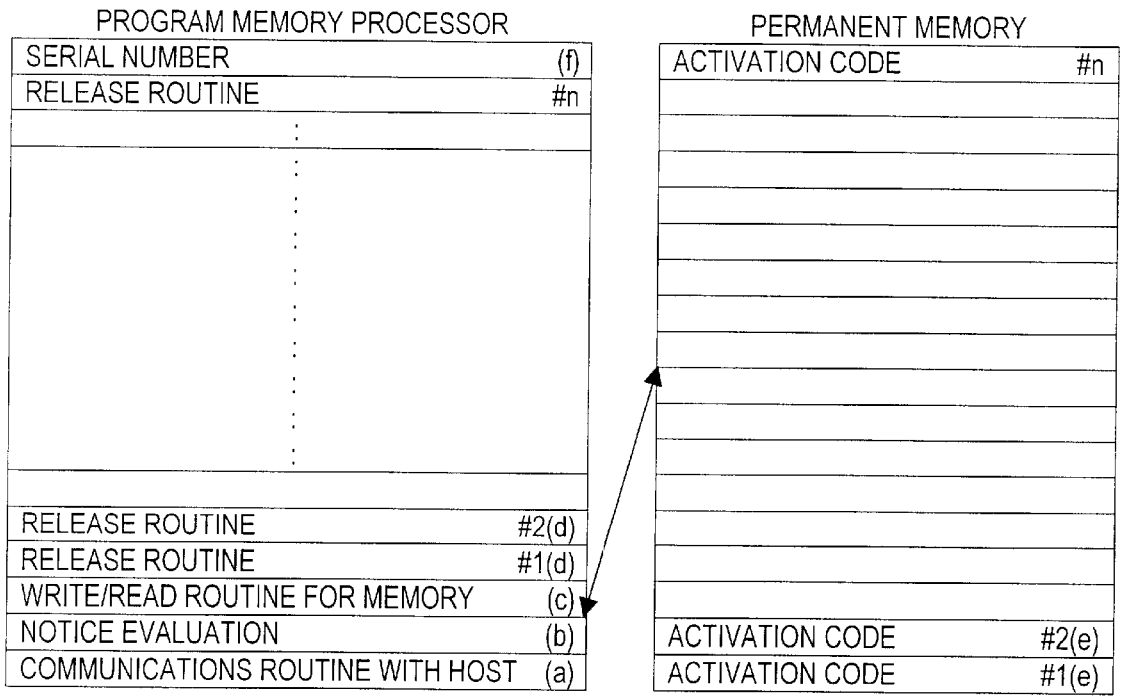
FIG. 1 shows a schematic illustration of the organization of the program memory and of the activation code memory of a protective device according to the invention.

The program memory 7 in embodiment example according to FIG. 1 is administered by microprocessor 1 which operates the information exchange between the installation 4 to be protected and the protective device 5 and conducts further operations for the purpose of the release or locking of certain functions of the installation 4.

As can be seen from the schematic construction of both memory 7 and memory 2 shown in FIG. 1, a plurality of release programs d, 1 . . . n, and, in the activation code memory 2, the activation codes e, 1 . . . n corresponding to the release programs are stored in the read-protected program memory 7, whereas the individual release programs d, 1 . . . n are callable separate from one another.

The embodiment of a protective device according to the invention as shown in FIG. 2 contains, in the protective device 5, a microprocessor with a read-protected flash-PROM program memory 7, in which program parts a–d and identification number f are stored according to FIG. 1. The activation codes e are deposited in the EEPROM 2. The communication with the installation to be protected occurs via the parallel interface 3; it could, however, also occur serially based on the interface built into processor 1. The power supply of the protective device 5 occurs from the parallel interface.

The telephone installation 4 to be protected is provided with a maintenance modem by which several release programs can be activated or de-activated via modem. Likewise, the protective device can be delivered from the plant already pre-configured. The protective device 5 according to the invention controls, for a plurality of release programs or program parts of the telephone installation 4, the corresponding release programs which are of different types and can be activated or changed independently of one another. The activation, de-activation or modification occurs via the communications interface 3 of the protective device 5 according to the invention, whereas the corresponding activation codes that depend on their identification number are valid for only one release program in only this protective device. Therefore, a non-secure transfer of the activation code, for example, to the maintenance modem of the telephone installation 4, authorized. The communication can also occur decoded to increase security.

The activation codes are best calculated using PC-programs and can be input with an existing data path, such as a network, modem or the like or manually via a terminal. The identification number and the number of the release program 1 . . . n (FIG. 1) to be activated or modified can be worked from the protective device 5 into a code from which the corresponding activation codes can be calculated. The activation codes can be queried from the protective device.

In FIG. 2, the inner processes in a query made by the installation 4 to be protected are to be taken, with which a locked program part should be released.

1) In a first step, a query, sent from the installation 4 by means of a communications routine a, for a program or a program part for a protected function to the protective device 5 is performed.

2) In a second step, that of the release program d (#1 . . . #n) which has been deposited in the memory is found via a message evaluation routine b, with which the query is answerable.

3) In a third step, the activation code e (#1 . . . #n) is read from the memory 2 and decoded with the aid of a write/read routine c, and the result obtained therefrom is compared to the identification number f of the protective device. The identification number f is deposited in the program memory 7.

4) In a fourth step, upon agreement of the identification number f and the decoded activation code e, the locked program or program part in the installation 4 is released using the found release program d, or the program or program part remains locked in response to the query if there is no agreement of the identification number f and the decoded activation code e.

The activation codes do not need to be encoded, since each activation code only acts on the protective device according to the invention for which it has been generated; thus the activation code has to fit to the desired protected function and to the internal identification number of the protective device. To prevent a successful probing of the activation number, the code should have at least 32 bit=9 decimal places.

To further complicate the probing, it is recommended to accept all activation codes, to run the corresponding release programs, however, slightly falsified upon invalid activation code, so that the program to be protected is not correctly run.

A thus-appropriate variation of the fourth step can consist of that, upon there being no agreement of the identification number with the decoded activation code, the program or program part corresponding to the query is released with only a limited functionality or with a time limit.

If, upon inputting of an activation code, it were immediately noticeable from the answer whether or not a code is correct, all possible activation codes could be tested automatically and very quickly using corresponding programmed calculators. For such a case, very long activation codes of 64 bit or more each should be employed.

Furthermore, it can be provided that, in the fourth step, upon there being no agreement of the identification number with the decoded activation code, a signal-release routine is started which triggers a signaling. This signaling can consist of that an attempt made using an incorrect activation code is reported via an existing modem, so that a central office is notified thereof. Further, there is the possibility that such an input is saved along with the date and time of day in a memory from which this information can again be retrieved later.

The activation codes can also be delivered via modem or through input using a keyboard to the installation to be protected and from there to the protective device according to the invention.

A further variation of the invention can consist of that, in the third step, the corresponding activation code is read from the activation code memory and mathematically tied to the identification number, through which a functional part of the release program, for example, a calculation constant or a program code is formed.

Then the fourth step is dropped completely, since the release program automatically delivers incorrect results upon input of an incorrect activation code. This variation can, thus, even be used for the re-programming of the release programs, given longer activation codes.

To record further activation codes into the protection arrangement 5, the following procedure is selected:

1) A query of the number (1 . . . n) of the release program to be released is sent to the protective device.

2) The evaluation routine b generates a code from the identification number f and the number of the release program.

3) The code is sent via modem, fax, telephone, network connection or the like to the licensor.

4) At the licensor, an answer code is generated by means of a program.

5) The answer code is sent back to the protective device which stores the same as activation code.

Above items 2 and 3 can be dropped if the licensor knows the internal identification number of the protective device.

In order to delete an activation code, one proceeds in the same way as with the inputting. The message to the protective device contains for the number of the activation code an incorrect code, with which no release of the function is achievable.

What is claimed is:

1. A protective device for the protection of an electronic apparatus, an installation, a system or the like against use of functions that is can be performed via lockable programs or program parts, which device is can be connected via an interface with the apparatus, installation, system or the like to be protected, whereas the protective device is assigned a predetermined identification number and the protective device contains a preferably non-erasable memory, for example, an EEPROM for the storing of at least one activation code, which activation code is can be compared to an identification number and a read-protected program memory for the storing of at least one release program is provided, which release program is run upon agreement of the activation code with the identification number of the protective device, the read-protected program memory (7) for the storing of at least one release program is arranged along with the memory for the storing (2) of at least one activation code in the protective device (5) modifying the state of at least one feature in a protected device having a plurality of features, the protective device comprising:

a interface adapted to communicate with the protected device, a processor in communication with the interface, a non-erasable memory in communication with the processor for storing a plurality of activation codes, a read-protected memory in communication with the processor for storing a plurality of release programs corresponding to the activation codes, and wherein the processor contains instructions for:

receiving a request from the protected device to modify the state of the at least one feature, the request including an identification number of the protected device, identifying a release program from within the plurality of release programs corresponding to the at least one feature, identifying an activation code from within the plurality of activation codes corresponding to the at least one feature, and comparing the activation code to the identification number to determine if there is an agreement between the activation code and the identification number, if there is an agreement, then executing the identified release program to modify the state of the at least one feature.

2. The protected device of claim 1 wherein the instructions further comprise decoding the activation code.

3. The protected device of claim 2 wherein the comparing further comprises: comparing the decoded activation code to the identification number to determining if there is an agreement between the decoded activation code and the identification number, if there is agreement, then executing the identified release program to modify the state of the at least one feature.

4. The protective device of claim 1 wherein the interface is a parallel interface which is adapted to supply power to the protective device from the protected device.

5. The protective device of claim 1 wherein the instructions further comprise executing the identified release program to permit limited functionality of the at least one feature in an event of no agreement between the between the activation code and the identification number.

6. The protective device of claim 1 wherein the instructions further comprise executing the identified release program to modify the state of the at least one feature for a predetermined period of time in an event of no agreement between the between the activation code and the identification number.

7. The protective device of claim 1 wherein the instructions further comprise executing a signaling routine which instructs the protected device to send a signal to a predetermined address, the signal indicating an attempt to modify the state of at least one feature.

8. The protective device of claim 7, wherein the signaling routine is executed only in an event of no agreement between the activation code and the identification number.

9. The protective device of claim 1 wherein the agreement is a mapping of the activation code to a function of the identification number.

10. A system to activate or deactivate modifiable features, the system comprising:

a protected device having a plurality of modifiable features and an identification means, a protective device for modifying the modifiable features of the protected device, wherein the protective device is adapted to be in selective in communication with the protected device and the protective device comprises:

a processor, a first memory in communication with the processor for storing a plurality of activation codes, a second memory in communication with the processor for storing a plurality of release programs corresponding to the activation codes, and wherein the processor contains instructions for:

receiving a request from the protected device for a modification of a modifiable feature, the request including the identification means, locating a release program from within the plurality of release programs corresponding to the modifiable feature, locating an activation code from within the plurality of activation codes corresponding to the modifiable feature, and comparing the activation code to the identification number to determining if there is an agreement between the activation code and the identification number, if there is agreement, then executing the located release program to modify the modifiable feature.

11. The system of claim 10 further comprising a parallel interface which is adapted to supply power from the protected device to the protective device.

12. The system of claim 10 wherein the instructions further comprise executing the located release program to modify the modifiable feature with limited functionality in the event of no agreement between the between the activation code and the identification number.

13. The system of claim 10 wherein the instructions further comprise executing the located release program to modify the modifiable feature for a predetermined period of time in the event of no agreement between the between the activation code and the identification number.

14. The system of claim 10 wherein the instructions further comprise executing a signaling routine which instructs the protected device to send a signal to a predetermined location, the signal indicating an attempt to modifying the modifiable feature.

15. The system of claim 14, wherein the signaling routine is executed only in an event of no agreement between the activation code and the identification number.

16. The system of claim 10 wherein agreement is a mapping of the decoded activation code to a function of the identification number.

17. A method for activating or deactivating modifiable features in a protected device coupled to a protective device, the method comprising:

receiving a request from the protected device for a modification of a modifiable feature, the request including an identifier for the protected device, locating a release program from within a plurality of release programs, wherein the release program corresponds to the modifiable feature, locating an activation code from within the plurality of activation codes wherein the activation code corresponds to the modifiable feature, and comparing the activation code to the identifier to determining if there is an agreement between the activation code and the identifier, if there is an agreement, then executing the located release program to modify the modifiable feature.

18. The method of claim 17 further comprising executing the located release program to modify the modifiable feature with limited functionality in an event of no agreement between the between the activation code and the identifier.

19. The method of claim 17 further comprising executing the located release program to modify the modifiable feature for a predetermined period of time in an event of no agreement between the activation code and the identifier.

20. The method of claim 17 further comprising executing a signaling routine which instructs the protected device to send a signal to a predetermined address, the signal indicating an attempt to modify the modifiable feature.

21. The method of claim 20, wherein the signaling routine is executed only in the event of no agreement between the activation code and the identifier.

22. The system of claim 17 wherein the agreement is a mapping of the decoded activation code and to a function of the identifier.

* * * * *